US006781336B2

(12) United States Patent
Henry

(10) Patent No.: US 6,781,336 B2
(45) Date of Patent: Aug. 24, 2004

(54) METHOD AND APPARATUS FOR CONTROLLING ELECTRIC SERVO ACTUATORS

(75) Inventor: William B. Henry, Ann Arbor, MI (US)

(73) Assignee: GE FANUC Automation North America, Inc., Charlottesville, VA (US)

( * ) Notice: Subject to any disclaimer, the term of this patent is extended or adjusted under 35 U.S.C. 154(b) by 21 days.

(21) Appl. No.: 10/092,183

(22) Filed: Mar. 5, 2002

(65) Prior Publication Data

US 2003/0169009 A1 Sep. 11, 2003

(51) Int. Cl.$^7$ .............................................. G05B 11/32
(52) U.S. Cl. ........................ 318/562; 318/684; 307/44; 340/310.01
(58) Field of Search ................................ 318/562, 569, 318/590, 600, 605, 637, 684; 307/44; 340/310.01, 310.02

(56) References Cited

U.S. PATENT DOCUMENTS

| | | | | |
|---|---|---|---|---|
| 4,163,218 A | * | 7/1979 | Wu | 340/310.02 |
| 4,335,381 A | * | 6/1982 | Palmer | 340/825.21 |
| 4,788,527 A | * | 11/1988 | Johansson | 340/310.02 |
| 4,926,158 A | * | 5/1990 | Zeigler | 340/310.02 |
| 5,614,811 A | * | 3/1997 | Sagalovich et al. | 323/207 |
| 5,986,539 A | * | 11/1999 | Johansson et al. | 340/310.01 |

OTHER PUBLICATIONS

"Intelogis Announces High–Speed Data Transmission Breakthrough in Powerline Networking™ Technology", pp. 5–6, Sep. 28, 2000.
GE Industrial Systems, Motion Control: Servo Motors and Amplifiers Servo Motors, "Featuring the Servos that Serve You", p. 1, Feb. 15, 2001, http://www.gefanuc.com/products/Motion/category.asp?cat_id=50.
GE Industrial Systems, Products: Motion Control Servo Motors and Amplifiers, "Unparalleled Performance for Demanding Applications", p. 1, Feb. 15, 2001, http://www.gefanuc.com/products/Motion/category.asp?cat_id=3.
GE Industiral Systems, Motion Control: Servo Motors and Amplifiers Servo Amplifiers, "Digital Amplifiers for a Wide Range of Applications", pp. 1–2, Feb. 15, 2001, http://www.gefanuc.com/products/Motion/category.asp?cat_id=39.

* cited by examiner

*Primary Examiner*—Bentsu Ro
(74) *Attorney, Agent, or Firm*—Karl A. Vick, Esq.; Armstrong Teasdale LLP

(57) ABSTRACT

A servomechanism having an actuator configured to convert electrical energy into mechanical energy and a controller configured for electrical connection to a power source. A power cable electrically connects the actuator and the controller. The power cable is configured to transmit electrical current from the controller to the actuator. At least one transducer is coupled to the actuator. The transducer is electrically connected to the power cable and is configured to transmit data over the power cable.

26 Claims, 4 Drawing Sheets

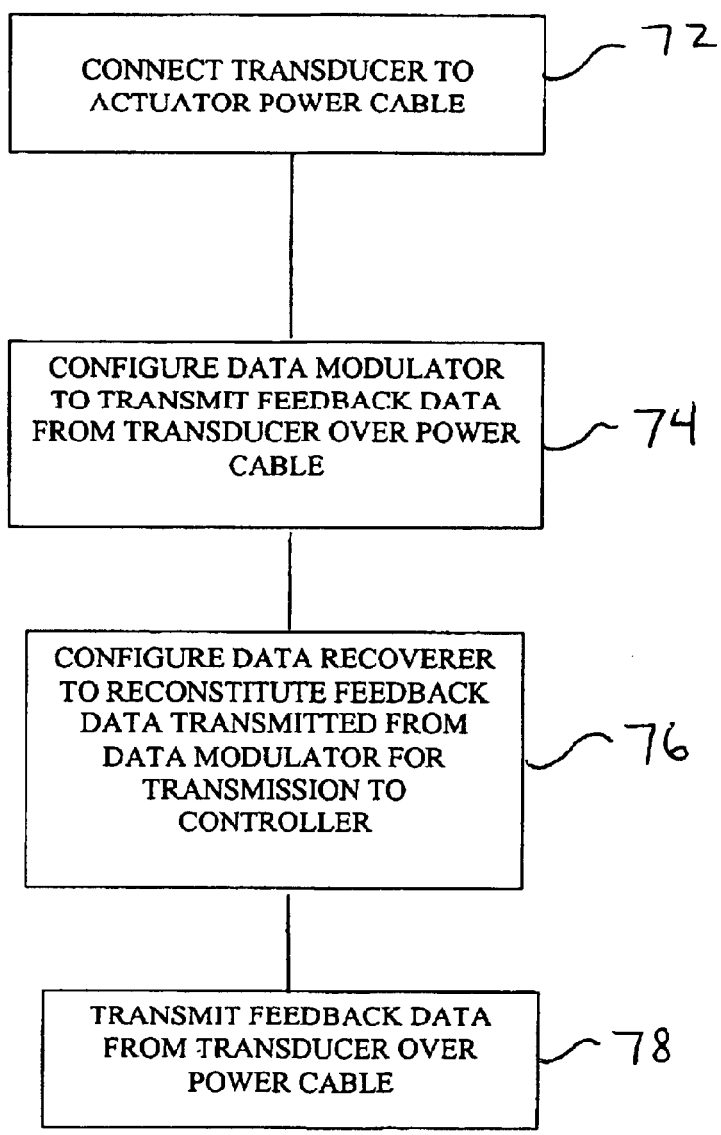

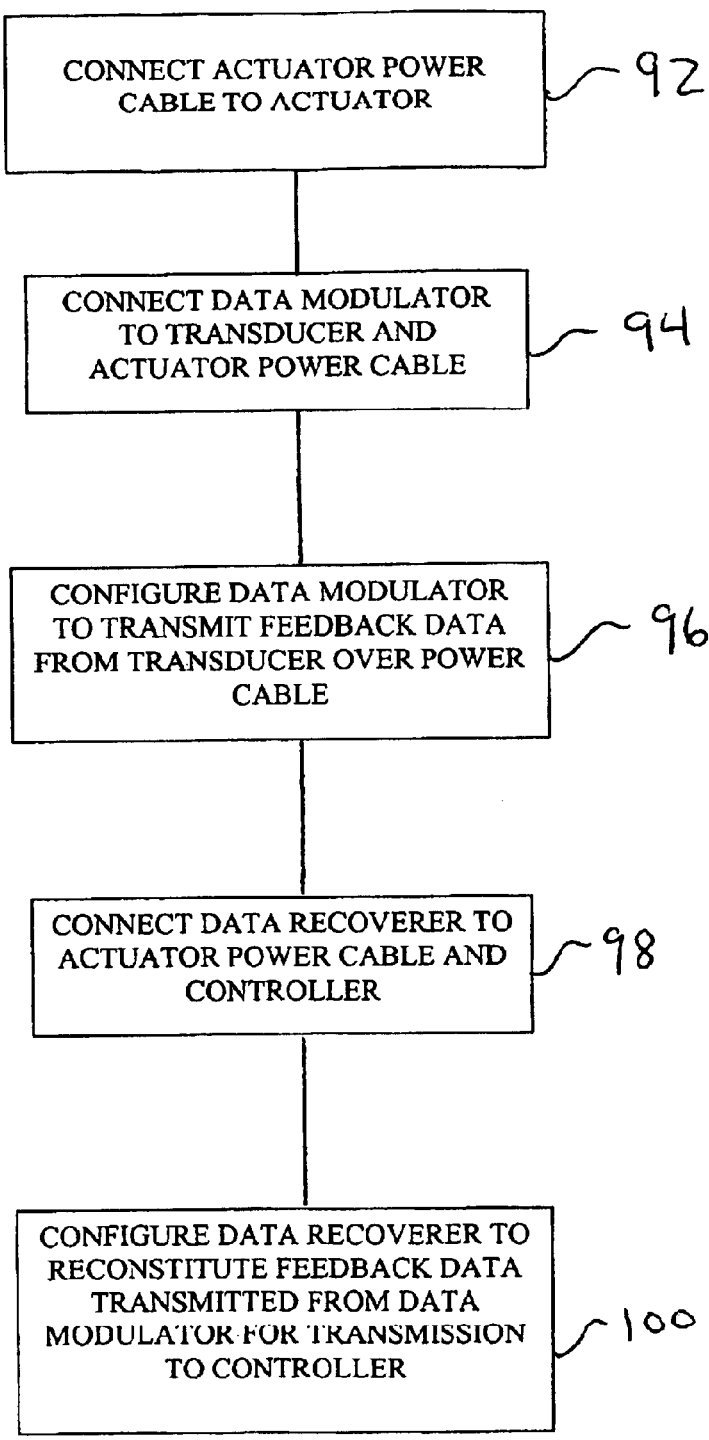

METHOD AND APPARATUS FOR CONTROLLING ELECTRIC SERVO ACTUATORS

BACKGROUND OF THE INVENTION

This invention relates generally to servomechanisms and more particularly to servomechanisms having an actuator configured to convert electrical energy into mechanical energy, hereinafter referred to as "electric servomechanisms".

Typical electric servomechanisms include an actuator configured to convert electrical energy into mechanical energy, also called an electric actuator. Electric Servomechanisms also typically include an amplifier, a controller, an actuator power cable, a feedback data cable and one or more transducers mounted on or within the actuator. The amplifier is electrically connected to the controller and receives electrical current from an external electrical power source. The amplifier is further electrically connected to the actuator via the actuator power cable and electrically connected to the transducer via the feedback data cable. In operation, the controller sends actuator command signals to the amplifier. The amplifier appropriately amplifies these electrical signals and transmits them to the actuator, thereby activating the actuator. The transducers measure actuator data, such as actuator temperature, velocity and position. This data, called feedback data, is transmitted through the feedback data cable to the amplifier and thereafter delivered to the controller. The controller compares this feedback data with desired input values. Based on this comparison, the controller determines the instructions necessary to bring the actuator data to the desired values and transmits these instructions to the amplifier.

Servomechanisms require separate cables to transmit electrical current to the actuator and feedback data to the amplifier. The cost of installing and maintaining such servomechanisms thus includes the cost of installing and maintaining both a power cable and a data cable. To reduce cost and maintenance, some electric servomechanisms include the amplifier electronics within the actuator. However, having the amplifier electronics within the actuator causes the actuator to run hotter and results in an increase in size to make room for amplifier electronics. Further, the amplifier still requires electrical current from an external electrical power source and an electrical connection to the controller for reception of actuator command signals.

BRIEF SUMMARY OF THE INVENTION

In one aspect, a servomechanism is provided that includes an actuator configured to convert electrical energy into mechanical energy and a controller configured for electrical connection to a power source. A power cable electrically connects the actuator and the controller. The power cable is configured to transmit electrical current from the controller to the actuator. At least one transducer is coupled to the actuator. The transducer is electrically connected to the power cable and is configured to transmit data over the power cable.

In another aspect, a servo motor assembly is provided that includes a motor and at least one transducer coupled thereto. A power cable configured for electrical connection to a power source is electrically connected to the motor and the transducer. The transducer is configured to transmit data over the power cable.

In yet another aspect, a method is provided for controlling a servomechanism including an actuator configured to convert electrical energy into mechanical energy. The servomechanism also includes a controller, a power cable electrically connected to the controller and the actuator, and a transducer coupled to the actuator. The power cable is configured to transmit electrical current from the controller to the actuator. The method includes electrically connecting the transducer to the power cable and transmitting data from the transducer over the power cable.

In a further aspect, a method is provided for installing an actuator configured to convert electrical energy into mechanical energy into a servomechanism. The servomechanism includes a controller, a power cable electrically connected to the controller, and at least one transducer configured to receive data from the actuator. The method includes electrically connecting the power cable to the actuator such that the power cable is configured to transmit electrical current from the controller to the actuator. The method further includes electrically connecting the transducer to the power cable and configuring the transducer to transmit data over the power cable.

BRIEF DESCRIPTION OF THE DRAWINGS

FIG. 3 is a flow chart illustrating the steps for controlling a servomechanism.

FIG. 4 is a flow chart illustrating the steps for installing an actuator configured to convert electrical energy into mechanical energy into a servomechanism.

DETAILED DESCRIPTION OF THE INVENTION

Figure 1:
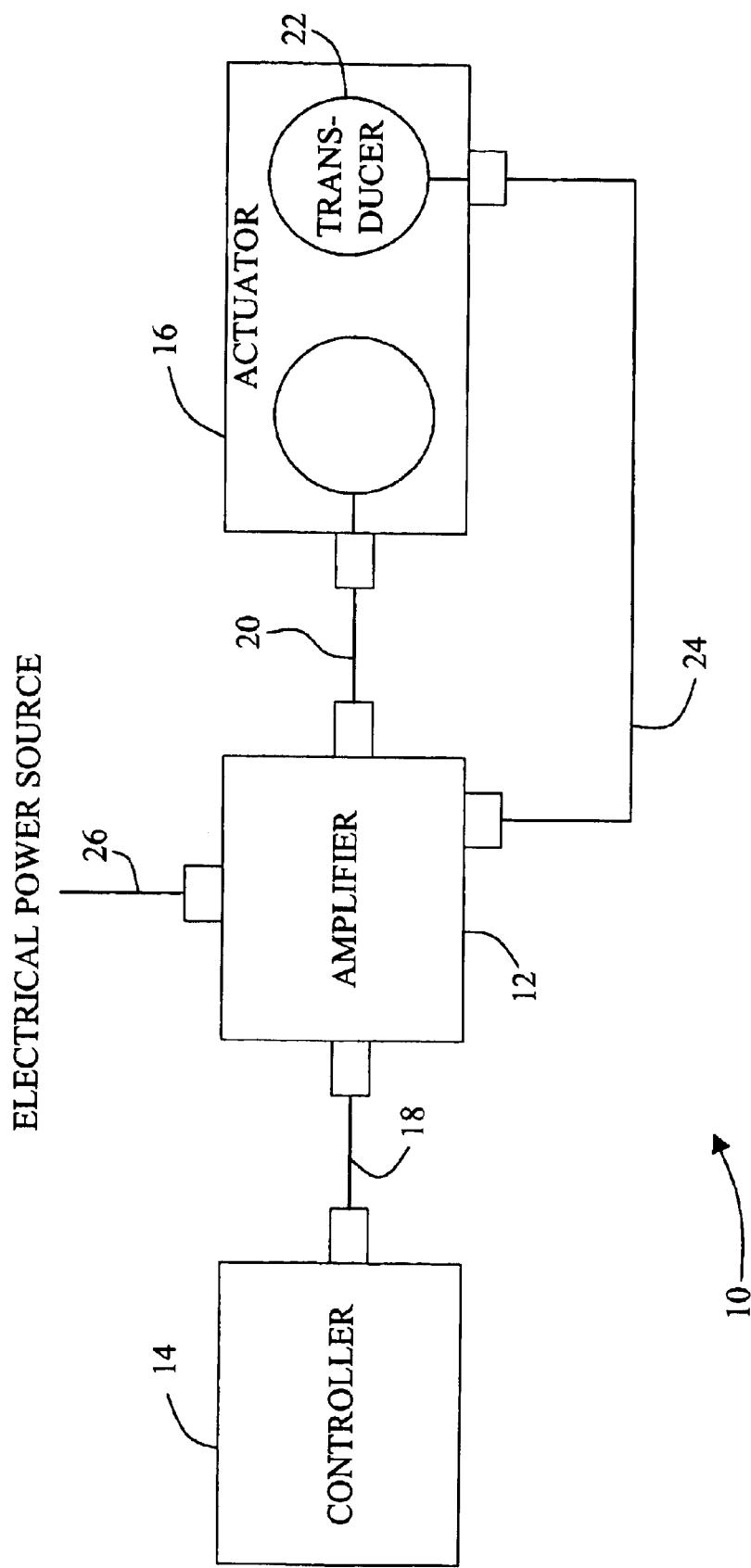
FIG. 1 is a block diagram illustrating a conventional electric servomechanism.

Referring now to the drawings, and in particular to FIG. 1, a known electric servomechanism 10 includes an amplifier 12, a controller 14 and an actuator 16. Actuator 16 converts electrical energy into mechanical energy. Amplifier 12 is electrically connected to controller 14 via a command signal connection 18. An actuator power cable 20 electrically connects amplifier 12 and actuator 16. A transducer 22 is provided within actuator 16 to measure certain actuator data, such as actuator position, temperature or velocity. Transducer 22 is electrically connected to amplifier 12 via a feedback data cable 24.

In operation, amplifier 12 is connected to an external electrical power source, shown at connection 26 in FIG. 1. Controller 14 transmits actuator command signals to amplifier 12 through command signal connection 18. Additionally, amplifier 12 communicates with controller 14 through command signal connection 18. When operation by actuator 16 is desired, controller 14 sends actuator command signals to amplifier 12. Amplifier 12 appropriately amplifies these received electrical signals and transmits them to actuator 16, thereby activating actuator 16. Transducer 22 measures data, or feedback data, from actuator 16 and converts the data into an electrical signal. Transducer 22 transmits the electrical signal through feedback data cable 24 to amplifier 22, which transmits the feedback data through command signal connection 18 to controller 14. Controller 14 compares the feedback data with a desired input value. Based on this comparison, controller 14 determines the instructions necessary to bring the actuator data to the desired value and transmits these instructions to amplifier 12.

Figure 2:
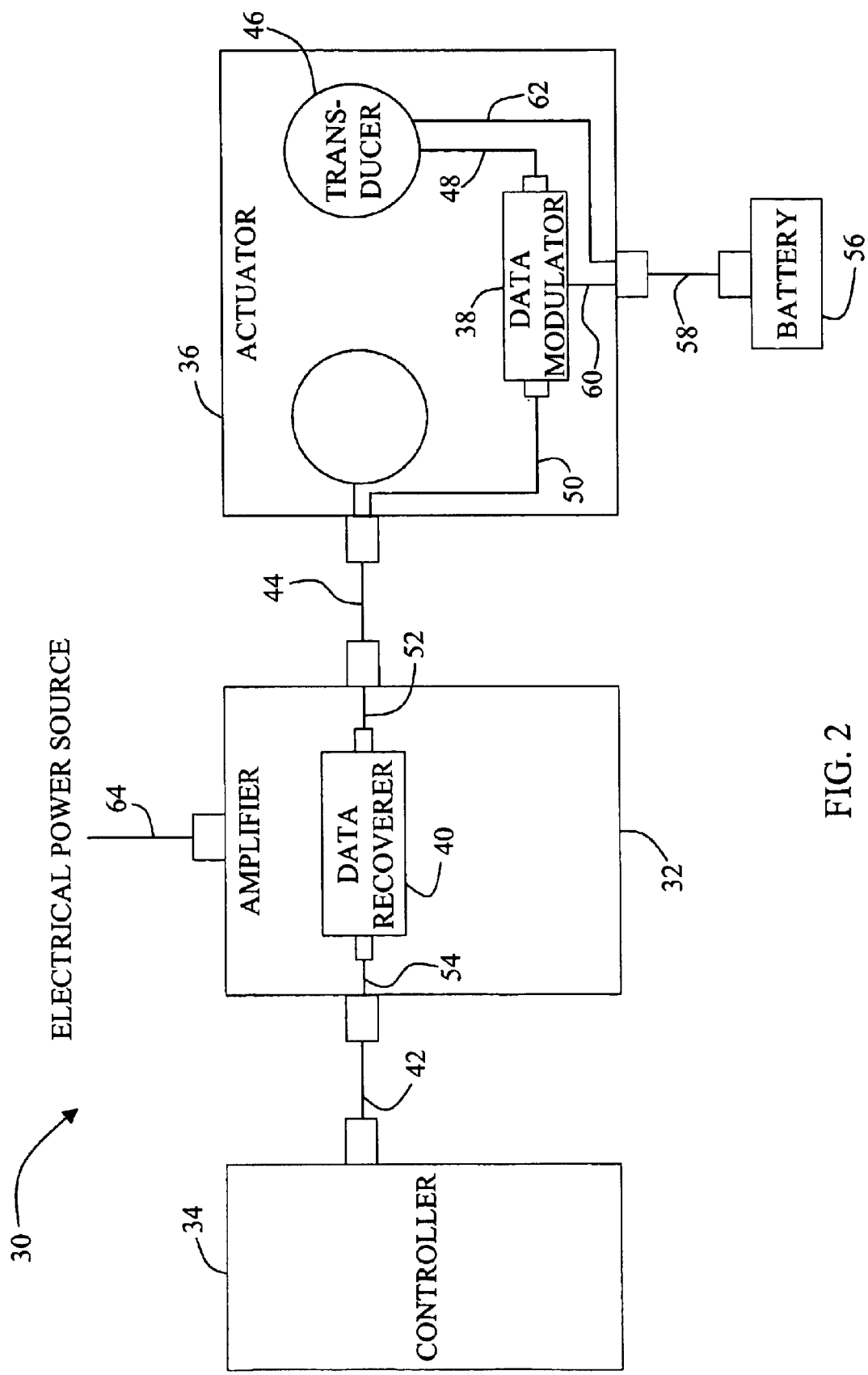
FIG. 2 is a block diagram illustrating one embodiment of the servomechanism of the present invention.

FIG. 2 illustrates one embodiment of a servomechanism 30 including an amplifier 32, a controller 34, an actuator 36, a data modulator 38 and a data recoverer 40. A command signal connection 42 electrically connects amplifier 32 and controller 34. Actuator 36 may be any actuator configured to convert electrical energy into mechanical energy. For example, in one embodiment, actuator 36 is an electric motor. In an alternative embodiment, actuator 36 is a resistance configured to convert electrical energy into heat. An actuator power cable 44 electrically connects amplifier 32 and actuator 36. In an alternative embodiment, servomechanism 30 does not include an amplifier 32, and controller 34 is electrically connected, directly or indirectly, to power cable 44, thereby electrically connecting controller 34 and actuator 36.

Actuator 36 includes a transducer 46 to measure specific actuator data, or feedback data. For example, feedback data may include, but is not limited to, actuator position, temperature and velocity. In one embodiment, transducer 46 is located in any position relative to actuator 36 allowing transducer 46 to measure the desired actuator data. For example, in an alternative embodiment, transducer 46 is coupled to an external surface of actuator 36. Further, servomechanism 30 may include more than one transducer. It is to be understood that the number of transducers included in servomechanism 30 depends on the amount and type of actuator data controller 34 is to monitor.

Data modulator 38 is electrically connected to transducer 46, shown at connection 48 in FIG. 2, and is positioned within actuator 36. Data modulator 38 is also electrically connected to actuator power cable 44, shown at connection 50. In an alternative embodiment, data modulator 38 is positioned anywhere within servomechanism 30 that permits data modulator 38 to be electrically connected to transducer 46 and actuator power cable 44. For example, in one embodiment, data modulator 38 is a separate package mechanically coupled to an external surface of actuator 36 or any other element of servomechanism 30. Other elements of servomechanism 30 include, but are not limited to, any structures used for mounting or fastening all or any portion of servomechanism 30.

Amplifier 32 includes data recoverer 40 positioned therein. Data recoverer 40 is electrically connected to actuator power cable 44 and command signal connection 42, shown at connections 52, 54, respectively. In an alternative embodiment, data recoverer 40 is positioned anywhere within servomechanism 30 that permits data recoverer 40 to be electrically connected to actuator power cable 44 and command signal connection 42. Further, in another embodiment, data recoverer 40 is electrically connected directly to controller 34. When data recoverer 40 is electrically connected directly to controller 34, it is to be understood that data recoverer 40 is positioned anywhere within servomechanism 30 such that data recoverer 40 is electrically connected to actuator power cable 44 and controller 34. Additionally, in another embodiment, data recoverer 40 is electrically connected directly to amplifier 32. When data recoverer 40 is electrically connected directly to amplifier 32, amplifier 32 transmits the feedback data received from data recoverer 40 to controller 34. Further, when data recoverer 40 is electrically connected directly to amplifier 32, it is to be understood that data recoverer 40 is positioned anywhere within servomechanism 30 such that data recoverer 40 is electrically connected to actuator power cable 44 and amplifier 32. For example, in one embodiment, data recoverer 40 is a separate package mechanically coupled to an external surface of amplifier 32 or any other element of servomechanism 30. Other elements of servomechanism 30 include, but are not limited to, any structures used for mounting or fastening all or any portion of servomechanism 30.

In one embodiment, actuator 36 includes a rechargeable battery 56 electrically connected to actuator 36, shown at connection 58. Rechargeable battery 56 is electrically connected to data recoverer 38 and transducer 46, shown at connections 60, 62, respectively.

In operation, amplifier 32 is connected to an external electrical power source at connection 64. Command signal connection 42 permits controller 34 to transmit actuator command signals to amplifier 32. Additionally, command signal connection 42 permits amplifier 32 to communicate with controller 34. When operation by actuator 36 is desired, controller 34 sends actuator command signals to amplifier 32. Actuator command signals may include, but are not limited to, torque, velocity and pulse signals. Amplifier 32 amplifies these electrical signals appropriately to provide the proper electrical current to drive actuator 36. In an alternative embodiment, amplifier 32 amplifies the voltage or a combination of the voltage and current of these electrical signals as required by actuator 36. Amplifier 32 then transmits the actuator command signals to actuator 36, thereby activating actuator 36. In an alternative embodiment, servomechanism 30 does not include amplifier 32 and controller 34 is a digital controller that outputs actuator command signals to directly control at least one semiconductor switch (not shown), which controls the flow of current and/or voltage to actuator 36.

Transducer 46 measures actuator data and converts it into an electrical signal. The feedback data output from transducer 46 may be in digital or analog form. In an alternative embodiment, the feedback data is a combination of digital and analog data. Transducer 46 transmits this electrical signal, or feedback data, through connection 48 to data modulator 38. Data modulator 38 is configured to convert the feedback data from transducer 46 into proper form for transmission through actuator power cable 44. When feedback data output from transducer 46 includes analog data, whether wholly or partially, data modulator 38 includes a suitable converter (not shown) to convert the analog data into digital form. Once the feedback data from transducer 46 is in proper form for transmission through actuator power cable 44, data modulator 38 transmits the feedback data through connection 50, actuator power cable 44 and connection 52 to data recoverer 40. Data recoverer 40 converts the feedback data transmitted from data modulator 38 back into its original form output from transducer 46. In an alternative embodiment, data modulator 38 reconstitutes the feedback data into any form readable by controller 34, even if such form is different from the form output by transducer 46.

When feedback data output from transducer 46 includes analog data, whether wholly or partially, data recoverer 40 includes a suitable converter (not shown) to convert the corresponding digital data from data modulator 38 into its original analog form. Once the feedback data from data modulator 38 is restored to its original form, data recoverer 40 transmits the feedback data through connection 54 and command signal connection 42 to controller 34.

Controller 34 compares the feedback data with desired input values. Based on this comparison, controller 34 determines the instructions necessary to bring the actuator data to the desired values and transmits these instructions to amplifier 12. Data modulator 38 and transducer 46 are powered from the electrical current supplied to actuator 36 from amplifier 32. Rechargeable battery 56 sustains power to data modulator 38 and transducer 46 when electrical current to actuator 36 is interrupted. Rechargeable battery 56 appropriately recharges itself from the electrical current supplied to actuator 36 from amplifier 32. In an alternative embodiment, data modulator 38 and transducer 46 are powered from an external electrical power source. Data recoverer 40 is powered from the electrical current supplied to amplifier 32 from an external electrical power source. In an alternative embodiment, data recoverer 40 is powered directly from an external power source.

FIG. 3 is a flowchart 70 illustrating the steps for controlling servomechanism 30 (shown in FIG. 2). In one embodiment, transducer 46 (shown in FIG. 2) is electrically connected 72 to actuator power cable 44 (shown in FIG. 2). Additionally, data modulator 38 (shown in FIG. 2) is configured 74 to transmit feedback data from transducer 46 over actuator power cable 44. Further, data recoverer 40 (shown in FIG. 2) is configured 76 to reconstitute the feedback data transmitted from data modulator 38 into a proper form for transmission to controller 34 (shown in FIG. 2). Finally, the feedback data from transducer 46 is transmitted 78 over actuator power cable 44.

FIG. 4 is a flow chart 90 illustrating the steps for installing actuator 36 (shown in FIG. 2) into servomechanism 30 (shown in FIG. 2). In one embodiment, actuator power cable 44 (shown in FIG. 2) is electrically connected 92 to actuator 36 such that actuator power cable 44 is configured to transmit electrical current from amplifier 32 (shown in FIG. 2) to actuator 36. Additionally, data modulator 38 (shown in FIG. 2) is electrically connected 94 to transducer 46 (shown in FIG. 2) and actuator power cable 44. Data modulator 38 is configured 96 to transmit feedback data from transducer 46 over actuator power cable 44. Further, data recoverer 40 (shown in FIG. 2) is electrically connected 98 to actuator power cable 44 and controller 34 (shown in FIG. 2). Data recoverer 40 is configured 100 to reconstitute feedback data transmitted from data modulator 38 into a proper form for transmission to controller 34. In another embodiment, data recoverer 40 is electrically connected (not shown) to actuator power cable 44 and amplifier 32 and is configured to reconstitute data from data modulator 38 for transmission to controller 34.

While the invention has been described in terms of various specific embodiments, those skilled in the art will recognize that the invention can be practiced with modification within the spirit and scope of the claims.

What is claimed is:

1. A servomechanism comprising:
   an actuator configured to convert electrical energy into mechanical energy;
   a controller configured for electrical connection to a power source;
   a power cable electrically connecting said actuator and said controller, said power cable configured to transmit electrical current from said controller to said actuator;
   at least one transducer coupled to said actuator, said transducer electrically connected to said power cable and configured to transmit data over said power cable; and
   an amplifier configured for electrical connection to a power source, said controller electrically connected to said amplifier, said power cable electrically connecting said actuator and said amplifier, and said power cable configured to transmit electrical current from said amplifier to said actuator.

2. A servomechanism in accordance with claim 1 wherein said actuator comprises an electric motor.

3. A servomechanism in accordance with claim 1 wherein said actuator comprises a resistance configured to convert electrical energy into heat.

4. A servomechanism in accordance with claim 1 further comprising:
   a data modulator electrically connected to said at least one transducer and said power cable;
   a data recoverer electrically connected to said controller and said power cable;
   said data modulator configured to transmit data from said at least one transducer over said power cable; and
   said data recoverer configured to reconstitute data transmitted from said data modulator into a proper form for transmission to said controller.

5. A servomechanism in accordance with claim 4 wherein said data recoverer configured to transmit data directly to said controller.

6. A servomechanism in accordance with claim 4 wherein said data modulator coupled to an external surface of said actuator.

7. A servomechanism in accordance with claim 4 wherein said data modulator positioned within an external surface of said actuator.

8. A servomechanism in accordance with claim 4 wherein said data recoverer coupled to an external surface of said actuator.

9. A servomechanism in accordance with claim 1 further comprising:
   a data modulator electrically connected to said at least one transducer and said power cable;
   a data recoverer electrically connected to said amplifier and said power cable, said data recoverer positioned within an external surface of said amplifier;
   said data modulator configured to transmit data from said at least one transducer over said power cable; and
   said data recoverer configured to reconstitute data transmitted from said data modulator into a proper form for transmission to said controller.

10. A servomechanism in accordance with claim 1 wherein said at least one transducer positioned within an external surface of said actuator.

11. A servomechanism in accordance with claim 1 wherein the data comprises analog data.

12. A servomechanism in accordance with claim 1 wherein the data comprises digital data.

13. A servo motor assembly comprising:
    a motor;
    at least one transducer coupled to said motor;
    a power cable configured for electrical connection to a power source and electrically connected to said motor and said at least one transducer, said at least one transducer configured to transmit data over said power cable; and
    an amplifier configured to be electrically connected to said motor via said power cable.

14. A servo motor in accordance with claim 13 further comprising:
    a data modulator electrically connected to said at least one transducer and said power cable; and
    said data modulator configured to transmit data from said at least one transducer over said power cable.

15. A servo motor in accordance with claim 14 wherein said data modulator coupled to an external surface of said motor.

16. A servo motor in accordance with claim 14 wherein said data modulator positioned within an external surface of said motor.

17. A servo motor in accordance with claim 13 wherein said at least one transducer positioned within an external surface of said motor.

18. A servo motor in accordance with claim 13 further comprising a controller electrically connected to said amplifier.

19. A method for controlling a servomechanism including an actuator configured to convert electrical energy into mechanical energy, a controller, a power cable electrically connected to the controller and the actuator, the power cable configured to transmit electrical current from the controller to the actuator, at least one transducer coupled to the actuator, an amplifier, a data modulator electrically connected to the at least one transducer and the power cable, and a data recoverer electrically connected to the power cable and the amplifier, the power cable electrically connected to the amplifier and the actuator, the controller electrically connected to the amplifier, said method comprising the steps of:

electrically connecting the at least one transducer to the power cable, said step of electrically connecting the at least one transducer further comprising the steps of:
configuring the data modulator to transmit data from the at least one transducer over the power cable; and
configuring the data recoverer to reconstitute data transmitted over the power cable by the data modulator into a proper form for transmission to the controller; and transmitting data from the at least one transducer over the power cable.

20. A method for installing an actuator configured to convert electrical energy into mechanical energy into a servomechanism including a controller, a power cable electrically connected to the controller, at least one transducer configured to receive data from the actuator, an amplifier, a data modulator electrically connected to the at least one transducer and the power cable, and a data recoverer electrically connected to the power cable and the amplifier, the power cable electrically connected to the amplifier and the actuator, the controller electrically connected to the amplifier, said method comprising the steps of:

electrically connecting the power cable to the actuator such that the power cable configured to transmit electrical current from the controller to the actuator;
electrically connecting the at least one transducer to the power cable, said step of electrically connecting the at least one transducer further comprising the steps of:
electrically connecting the data modulator to the at least one transducer and the power cable;
configuring the data modulator to transmit data from the at least one transducer over the power cable;
electrically connecting the data recoverer to the power cable and the amplifier; and
configuring the data recoverer to reconstitute data transmitted over the power cable by the data modulator into a proper form for transmission to the controller; and
configuring the transducer to transmit data over the power cable.

21. A method for controlling a servomechanism including an actuator configured to convert electrical energy into mechanical energy, a controller, a power cable electrically connected to the controller and the actuator, the power cable configured to transmit electrical current from the controller to the actuator, and at least one transducer coupled to the actuator, said method comprising the steps of:

electrically connecting the at least one transducer to the power cable;
transmitting data from the at least one transducer over the power cable; and
electrically connecting an amplifier to the actuator via the power cable.

22. A method in accordance with claim 21 further comprising electrically connecting the controller to the amplifier.

23. A method in accordance with claim 21 wherein the servomechanism further includes a data modulator electrically connected to the transducer and the power cable and a data recoverer electrically connected to the power cable and the controller, said step of electrically connecting the at least one transducer further comprising the steps of:

configuring the data modulator to transmit data from the at least one transducer over the power cable; and
configuring the data recoverer to reconstitute data transmitted over the power cable by the data modulator into a proper form for transmission to the controller.

24. A method for installing an actuator configured to convert electrical energy into mechanical energy into a servomechanism including a controller, a power cable electrically connected to the controller, and at least one transducer configured to receive data from the actuator, said method comprising the steps of:

electrically connecting the power cable to the actuator such that the power cable configured to transmit electrical current from the controller to the actuator;
electrically connecting the at least one transducer to the power cable;
configuring the at least one transducer to transmit data over the power cable; and
electrically connecting an amplifier to the actuator via the power cable.

25. A method in accordance with claim 24 further comprising electrically connecting the controller to the amplifier.

26. A method in accordance with claim 24 wherein the servomechanism further includes a data modulator and a data recoverer, said step of electrically connecting the at least one transducer further comprising the steps of:

electrically connecting the data modulator to the at least one transducer and the power cable;
configuring the data modulator to transmit data from the at least one transducer over the power cable;
electrically connecting the data recoverer to the power cable and the controller; and
configuring the data recoverer to reconstitute data transmitted over the power cable by the data modulator into a proper form for transmission to the controller.

* * * * *